US009211856B2

(12) United States Patent
Desbois-Renaudin et al.

(10) Patent No.: US 9,211,856 B2
(45) Date of Patent: Dec. 15, 2015

(54) BATTERY FOR AN ELECTRIC MOTOR OF A MOTOR VEHICLE

(75) Inventors: Matthieu Desbois-Renaudin, Villard de Lans (FR); Daniel Chatroux, Teche (FR); Eric Fernandez, Saint Paul de Varces (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 147 days.

(21) Appl. No.: 13/880,427

(22) PCT Filed: Oct. 17, 2011

(86) PCT No.: PCT/EP2011/068138
§ 371 (c)(1),
(2), (4) Date: Apr. 19, 2013

(87) PCT Pub. No.: WO2012/052417
PCT Pub. Date: Apr. 26, 2012

(65) Prior Publication Data
US 2013/0328392 A1 Dec. 12, 2013

(30) Foreign Application Priority Data

Oct. 19, 2010 (FR) ...................................... 10 58534

(51) Int. Cl.
*B60R 16/033* (2006.01)
*H01M 2/10* (2006.01)
*H01M 10/42* (2006.01)
*H01M 10/48* (2006.01)
*H01M 10/625* (2014.01)
*H01M 10/615* (2014.01)
(Continued)

(52) U.S. Cl.
CPC ........... *B60R 16/033* (2013.01); *H01M 2/1072* (2013.01); *H01M 2/1094* (2013.01); *H01M 10/4207* (2013.01); *H01M 10/486* (2013.01); *H01M 10/5016* (2013.01); *H01M 10/613* (2015.04); *H01M 10/615* (2015.04); *H01M 10/617* (2015.04); *H01M 10/625* (2015.04); *H01M 10/658* (2015.04); *H01M 10/6565* (2015.04); *H01M 10/637* (2015.04); *H01M 10/6571* (2015.04)

(58) Field of Classification Search
CPC ...................................................... H01M 10/50
USPC ......................................................... 307/10.1
See application file for complete search history.

(56) References Cited

U.S. PATENT DOCUMENTS

| | | | |
|---|---|---|---|
| 4,517,263 A | | 5/1985 | Reiss et al. |
| 4,684,589 A | * | 8/1987 | Van Dyke, Jr. ............... 429/184 |
| 6,123,266 A | * | 9/2000 | Bainbridge et al. ......... 236/49.3 |
| 2005/0126761 A1 | * | 6/2005 | Chang et al. ............. 165/104.33 |
| 2005/0242782 A1 | | 11/2005 | Kadouchi et al. |

(Continued)

FOREIGN PATENT DOCUMENTS

| | | |
|---|---|---|
| EP | 2133952 | 12/2009 |
| WO | 2009/119037 | 10/2009 |

*Primary Examiner* — Rexford Barnie
*Assistant Examiner* — Toan Vu
(74) *Attorney, Agent, or Firm* — Occhiuti & Rohlicek LLP

(57) ABSTRACT

A battery for powering an electrical motor drive of a motor vehicle includes electrochemical accumulators included in an adiabatic enclosure and included in a tightly-sealed enclosure. The tightly-sealed enclosure is air-tight and water-tight, contains the adiabatic enclosure, and has a volume that is external to the adiabatic enclosure and benefits from thermal exchanges with an exterior thereof. The battery also includes a valve that selectively sets up a flow of a heat-transfer fluid between the adiabatic enclosure and the volume.

11 Claims, 3 Drawing Sheets

(51) Int. Cl.
*H01M 10/617* (2014.01)
*H01M 10/6565* (2014.01)
*H01M 10/613* (2014.01)
*H01M 10/658* (2014.01)
*H01M 10/637* (2014.01)
*H01M 10/6571* (2014.01)

(56) References Cited

U.S. PATENT DOCUMENTS

2007/0133151 A1* 6/2007 Jeon et al. ............... 361/600
2012/0003510 A1* 1/2012 Eisenhour ............... 429/50
2012/0095382 A1* 4/2012 Hudson ................... 604/6.16

* cited by examiner

BATTERY FOR AN ELECTRIC MOTOR OF A MOTOR VEHICLE

CROSS REFERENCE TO RELATED APPLICATION

This application is the national phase under 35 USC 371 of international application no. PCT/EP2011/068138, filed Oct. 17, 2011, which claims the benefit of the priority date of French application no. 1058534, filed Oct. 19, 2010. The contents of the aforementioned applications are incorporated herein in their entirety.

FIELD OF DISCLOSURE

The invention pertains to motor vehicles and, in particular, to motor vehicles driven by electric motors.

BACKGROUND

The need to combat atmospheric pollution has led automobile manufacturers to develop vehicles that consume less fuel and even vehicles without internal combustion engines.

Thus, an increasing number of prototypes and series-manufactured vehicles comprise electric engines, either as their sole driving means or in association with internal combustion engines.

Such vehicles require batteries of electrochemical accumulators to store large quantities of energy in order to power the electric motors. An electrochemical accumulator usually has a nominal voltage of the following magnitude:

1.2 V for NiMH type batteries,
3.3 V for an iron phosphate, lithium-ion, LiFePO4 technology,
4.2 V for a lithium-ion technology based on cobalt oxide.

These nominal voltages are far too low for the requirements of the motor to be powered. To obtain the appropriate voltage level, several electrochemical accumulators are placed in series. To obtain high power and capacity levels, several sets of accumulators are placed in series. The number of stages (number of sets of accumulators) and the number of accumulators in parallel in each stage vary according to the current, the voltage and the capacitance desired for the battery.

The need for a large number of accumulators entails considerable extra cost for the vehicle. Furthermore, such accumulators have a limited service life which generally means that they are replaced at least once during the service life of the vehicle. Since this replacement entails high cost for the user, it is desirable to optimize the service life of the electrochemical accumulators to the maximum.

The conditions of operation and use of the battery have a considerable effect on this service life. Electrochemical accumulators generally operate over a limited temperature range of 0° C. to 60° C. Operation outside this temperature can range cause the accumulators to deteriorate or cause their destruction by thermal runaway. The optimal operating temperature is approximately 30° C. The closer the operation comes to the limits of the operating range, the greater the degradation of the service life of the accumulators. The optimum operating temperature of the accumulators that will guarantee their service life is therefore generally considered to be in the range of 10° C. to 45° C.

Keeping a battery within this range of temperature can prove to be difficult, since automobile vehicles are supposed to work satisfactorily in a temperature range of −30° C. to +45° C. To this end, a certain number of batteries have been developed with circuits for the flow of a liquid to regulate their temperature. Such batteries however prove to be heavier and more complex owing to the presence of the cooling liquid and the obligation of providing tight sealing between this cooling liquid and the electric connector of the accumulators. The ground of the batteries then forms a considerable part of the ground of the vehicle and can impair its performance and its dynamic behavior.

The batteries of motor vehicles also give rise to a certain number of additional design constraints. Automobile batteries must especially be water-tight in order to avoid short-circuits when they are subjected to weather vagaries or even when the vehicle is submerged. In addition, the batteries must be gas-tight. Gas-tightness firstly prevents steam from entering the battery and secondly prevents this steam from condensing when there is a change in altitude or temperature. The condensed water could in this case cause shorting. Furthermore, gas-tightness prevents toxic emanations towards the exterior when there is any accidental deterioration of an accumulator.

Batteries with thermal control by air circulation have also been developed. However, such batteries do not meet the conditions of water-tightness and gas-tightness mentioned here above. The battery especially shows risks of condensation when the air is taken from outside the vehicle or risks to passenger safety when the air is taken from inside the vehicle.

Thus, there is no solution to date that can guarantee the working of the battery in its optimum range of operation with reduced weight and satisfactory conditions of safety.

The document EP2133952 describes a battery provided with electrochemical accumulators. In one particular case, the accumulators are disposed in an adiabatic pack. This pack includes an internal separation between a flow of liquid and a flow of air.

Such a battery does not enable dynamic control, with high operational safety, over the thermal exchanges of the battery with the exterior.

SUMMARY

The invention is aimed at resolving one or more of these drawbacks. The invention thus relates to a battery for powering an electric motor drive of a motor vehicle, the battery comprising electrochemical accumulators and being characterized in that the electrochemical elements are included in an adiabatic enclosure and included in an air-tight and water-tight enclosure.

The tightly sealed enclosure contains the adiabatic enclosure and has a volume that is external to the adiabatic enclosure and benefits from thermal exchanges with the exterior, the battery comprising a valve which selectively sets up a flow of a heat-transfer fluid between the adiabatic enclosure and said volume.

According to another variant, the tightly sealed enclosure is configured to get elastically deformed during a variation in pressure within it.

According to yet another variant, the tightly sealed enclosure has at least one deformable face with an undulating section.

According to one variant, said deformable face is made out of a thermally conductive material.

According to another variant, the tightly sealed enclosure selectively sets up a flow of gas with the adiabatic enclosure and comprises an air/air exchanger with the exterior.

According to yet another variant, the battery comprises a circuit for the circulation of air between the electrochemical accumulators and comprises a device for generating a flow of air in said circuit.

According to yet another variant, the adiabatic enclosure has thermal resistivity with the exterior that is greater than 0.1 $m^2.K/W$.

According to one variant, the adiabatic enclosure is filled with an inert gas.

The invention also pertains to a motor vehicle comprising:
an electric motor;
a battery as defined here above powering the electric motor, the thermal time constant of the battery being at least twice the autonomy of the vehicle driven by the electric motor.

According to one variant, the vehicle comprises:
a probe for measuring the temperature inside the adiabatic enclosure;
a probe for measuring the temperature outside the battery;
a command module setting up the flow of heat-transfer fluid between said external volume and the adiabatic enclosure when:
the external temperature is higher than the temperature in the adiabatic enclosure and the temperature in the adiabatic enclosure is lower than a low threshold; or
the external temperature is lower than the temperature in the adiabatic enclosure and the temperature in the adiabatic enclosure is higher than a high threshold.

According to one variant, the command module is capable of determining the absence of powering of the motor by the battery, making the establishment of the flow of heat-transfer fluid conditional on the determining of the absence of the powering of the motor by the battery.

According to yet another variant, the battery comprises a circuit for balancing the charges of the accumulators that is housed in the adiabatic enclosure and is provided with at least one discharging resistor, the command module being capable of activating a discharging of the accumulators in said discharging resistor when the temperature inside the adiabatic enclosure is lower than the low threshold and when an absence of powering of the motor has been determined.

BRIEF DESCRIPTION OF THE DRAWINGS

Other features and advantages of the invention shall appear more clearly from the following description given here below by way of an indication that is in no way exhaustive, with reference to the appended drawings, of which.

DETAILED DESCRIPTION

The invention proposes to achieve maximum reduction in the thermal exchanges between the exterior and the electrochemical accumulators of a battery for powering the drive of a motor vehicle, by furthermore including these electrochemical elements in an air-tight and water-tight enclosure.

The tightly-sealed enclosure contains the adiabatic enclosure. It has a volume that is external to the adiabatic enclosure and benefits from the thermal exchanges with the exterior, the battery comprising a valve selectively setting up a flow of heat-transfer fluid between the adiabatic enclosure and said volume.

The invention ensures both that there will be no short-circuits of the battery through splashing, submersion and condensation and that the electrochemical accumulators can be maintained in their optimum range of operation even when the surrounding temperatures are extreme.

Figure 1:
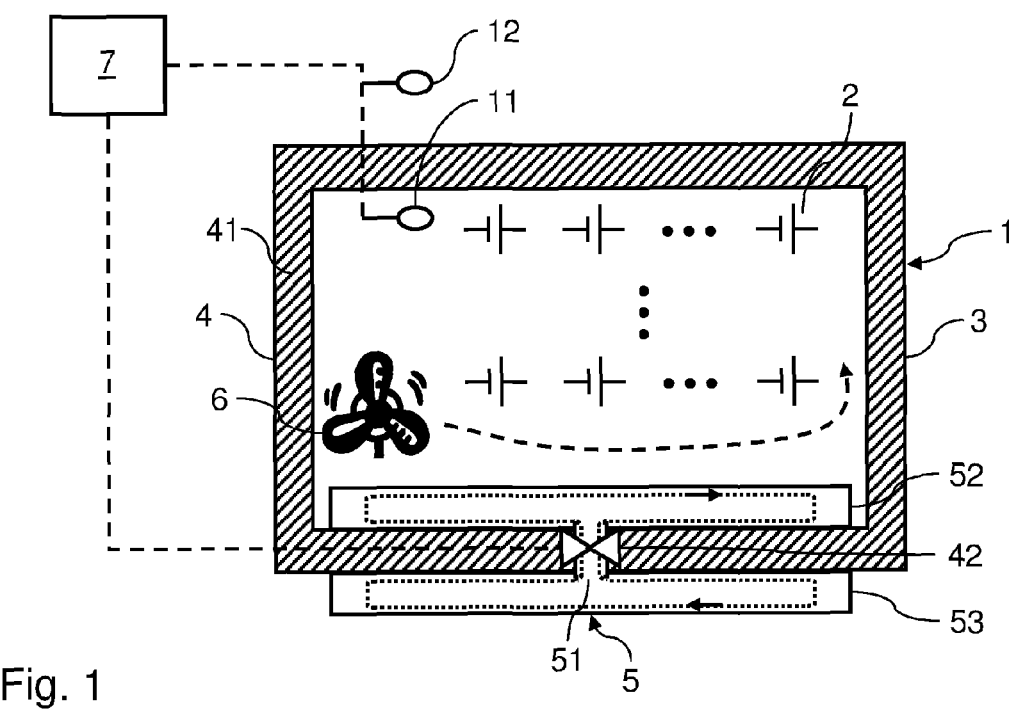
FIG. 1 is a schematic representation in section of a first variant of a battery according to the invention.

FIG. 1 is a schematic representation in a view in section of a first variant of a battery 1 according to the invention. The battery 1 has a wall 41 demarcating the adiabatic enclosure 4. Electrochemical cells or accumulators 2 are included inside the wall 41.

The electrochemical accumulators 2 can be connected in a manner known per se to form several series-connected stages, each stage comprising several parallel-connected accumulators. The battery 1 comprises two electric connection terminals, not shown, outside the wall 41, enabling the electrochemical accumulators 2 to power an electric charge.

The enclosure 4 will be considered to be adiabatic if it has a thermal resistivity greater than 0.1 $m^2$ K/W. The enclosure 4 preferably has thermal resistivity greater than 0.2 $m^2$ K/W. The enclosure 4 thus makes it possible to almost eliminate thermal exchanges with the external environment when the temperature conditions encountered are incompatible with the optimum temperature of operation of the accumulators 2. This design runs counter to a common technical prejudice according to which the heat generated inside the battery by Joule effect has to be discharged out of the battery by maximizing the thermal exchanges of this battery with the exterior during its operation. An adiabatic enclosure 4 could be formed by any appropriate means known per se. The interior of the enclosure 4 could also be lined with a reflective surface in order to reduce the energy exchanges with the exterior by radiation.

The combination of the wall 41 and an exchanger 53 form a gas-tight and water-tight enclosure 3. The materials and the structure of the wall 41 could also be selected in a manner known per se to ensure gas and water tightness inside the tightly-sealed enclosure 3. The tightly-sealed enclosure 3 could for example be designed to comply with the IP65 standard on protection against splashing water or the IP68 standard against prolonged immersion. Water tightness prevents short-circuits that result from the introduction of water inside the battery 1. Gas tightness first of all prevents the entry of moisture into the battery 1 (entail the risk of generating a short circuit during condensation) and secondly prevents an emission of toxic gas towards to users in the event of destruction of an accumulator 2.

The battery 1 advantageously has a circuit for the circulation of gas between the accumulators 2 as well as a ventilation device 6 enabling the generation of a flow of gas in this circuit. Such a gas-flow circuit makes it possible to homogenize the temperature of the different accumulators 2 and thus prevent excessive variations in service life between the different accumulators 2. Repeated differences in temperature over numerous operating cycles of the battery 1 could indeed induce very different degrees of ageing of the accumulators 2 and compel the changing of the battery despite the presence of numerous accumulators that are still operational. Such a ventilation device 6 will prove to be particularly advantageous when the current provided by the battery 1 to an electric motor is great. The interior of the adiabatic enclosure 4 can be filled with a neutral gas (such as argonite or $CO_2$) in order to prevent an input of oxygen in the event of an accident. The gas for filling the adiabatic enclosure 4 could also be advantageously chosen so as to maximize the thermal exchanges inside the enclosure 4, limit leakages, and even increase the thermal inertia of the content of the enclosure 4.

A temperature probe 11 is housed within the wall 4. The temperature probe 11 is connected to an electronic control and command module 7. The module 7 is connected to a temperature probe 12 measuring the temperature of the external environment.

An orifice 51 is made in the wall 41. The orifice 51 is plugged by a valve 42. The valve 42 can be selectively closed or opened by means of the command module 7. The battery 1 furthermore has a heat exchanger 5. The heat exchanger 5 comprises an air/air exchanger 52 housed inside the adiabatic enclosure 4. The heat exchanger 5 furthermore comprises an air/air exchanger 53 housed outside the adiabatic enclosure 4. The internal volume of this exchanger 53 thus carries out thermal exchanges with the exterior. The combination of the wall 41 and the exchanger 53 form the gas-tight and water-tight enclosure 3. The tightly sealed enclosure 3 thus contains the adiabatic enclosure 4.

When the valve 42 is open, a flow of air can be sustained inside the exchangers 52 and 53 and between these exchangers 52 and 53. Thus, when the valve 42 is open, it is possible to ensure thermal exchange between the interior of the enclosure 4 and the exterior. On the contrary, when the valve 42 is closed, the accumulators 2 are kept thermally insulated from the exterior.

Such a variant makes it possible to modify the temperature inside the battery 1 preferably outside the periods of supply of the electric motor, in benefiting from external temperature conditions. The module 7 can actuate the opening and closing of the valve 42 as a function of the respective temperatures measured by the probe 11 and the probe 12.

For example, when the battery 1 does not power the electric motor, if the temperature in the enclosure 4 measured by the probe 11 is above a high threshold (for example because of prolonged operation associated with a prolonged presence of the vehicle in a state of very high temperature) and if the outside temperature measured by the probe 12 is below the temperature measured by the probe 11 (for example at a relatively low temperature on a summer night), then the valve will be opened to generate a heat exchange between the exterior and the interior of the enclosure 4. Thus, during the next use of the battery 1, it will be possible to reduce its temperature preliminarily with reduced electricity consumption. The service life of the battery 1 could thus be increased by a control made outside its periods of operation.

According to another example, when the battery 1 does not power the electric motor, if the temperature in the enclosure 4 measured by the probe 11 is below a low threshold (for example because the vehicle has been parked for an extended period at very low temperature) and if the external temperature measured by the probe 12 is greater than the measurement of the probe 11 (for example because the vehicle has been temporarily placed in a garage), then the valve 42 will be opened to generate a thermal exchange with the exterior and interior of the enclosure 4. Thus, during the next use of the battery 1, it will be possible to preliminarily increase its temperature with reduced electricity consumption. The top and bottom thresholds could for example be set at 45° C. and 10° C. According to yet another example, when the vehicle is at a stop and the battery 1 is being charged, losses by Joule effect could be artificially generated inside the enclosure 4 in order to increase its temperature. Such losses by Joule effect could for example be generated by discharging the accumulators or an external electricity source into resistors of a charge-balancing circuit housed inside the battery 1.

Thus, it is possible to avoid problems related to the introduction of gas or water while at the same time generating a thermal exchange with the battery 1 only in appropriate conditions.

Figure 2:
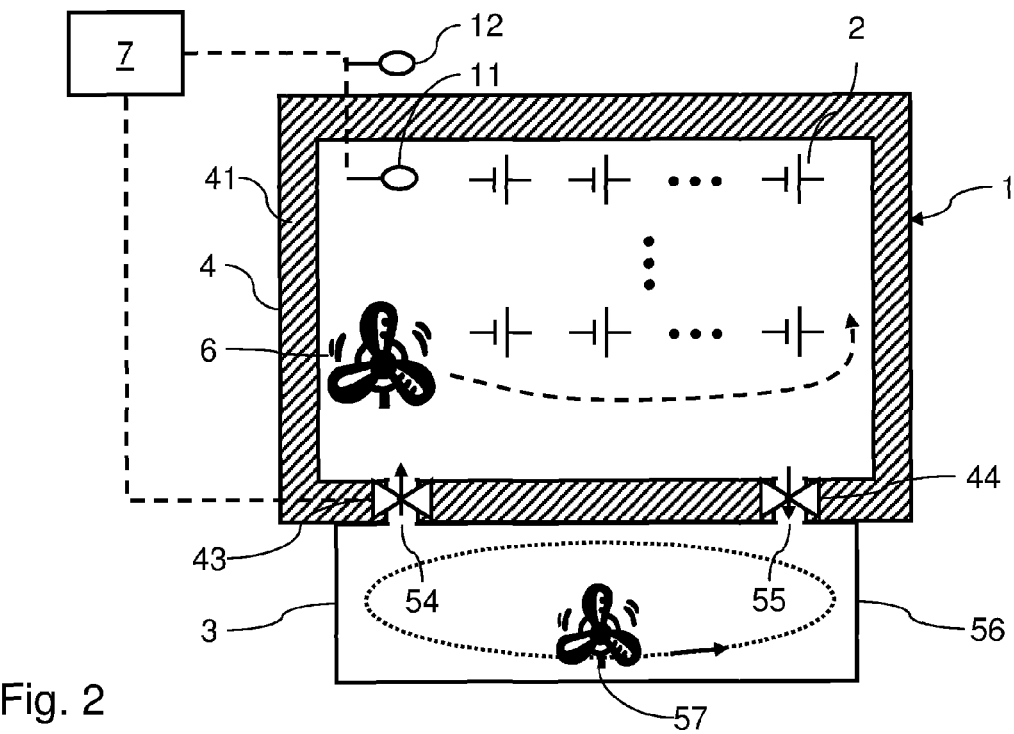
FIGS. 2 and 3 are schematic representations in section of a second variant of a battery according to the invention.
Figure 3:
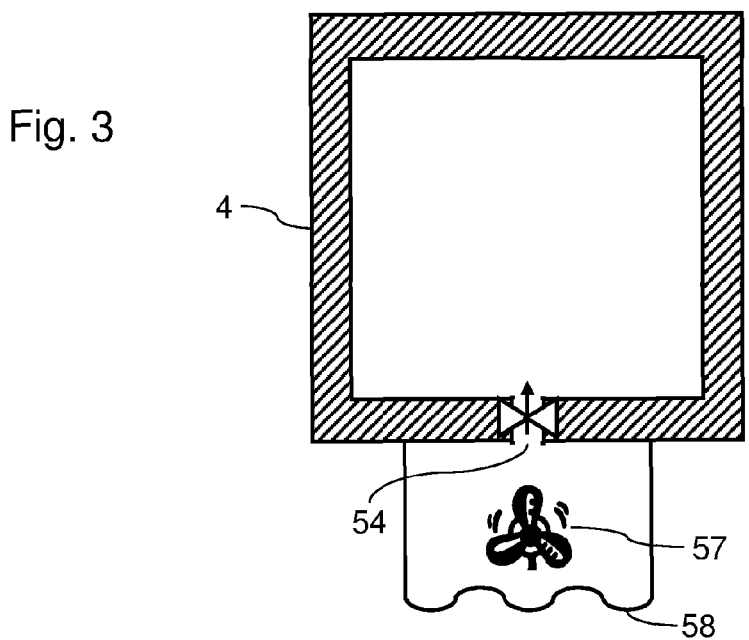

FIGS. 2 and 3 are schematic views in axial and cross-section respectively of a battery 1 according to a second variant. As in the example of FIG. 1, this battery 1 has a wall 41 demarcating the adiabatic enclosure 4. Electrochemical cells 2 are included inside the wall 41. A ventilation device 6 generates a flow of air in an air-flow circuit made between the accumulators 2.

Orifices 54 and 55 are made in the wall 41. The orifices 54 and 55 are plugged respectively by valves 43 and 44. The valves 43, 44 can be selectively closed or opened by means of the command module 7.

The battery 1 furthermore has an air/air exchanger 56. The heat exchanger 56 demarcates an internal volume achieving thermal exchanges with the exterior. The combination of the wall 41 and the exchanger 56 forms the gas-tight and water-tight enclosure 3. The tightly sealed enclosure 3 thus contains the adiabatic enclosure 4. A ventilation device 57 generates a flow within the exchanger 56 and with the interior of the enclosure 4 when the valves 43 and 44 are open.

When the valves 43 and 44 are simultaneously open, a flow of air can be sustained between the exchanger 56 and the adiabatic enclosure 4. Thus, when the valves 43 and 44 are open, it is possible to provide for a thermal exchange between the interior of the enclosure 4 and the exterior. On the contrary, when the valves 43 and 44 are closed, the accumulators 2 are kept thermally insulated from the exterior.

In this example, the tightly sealed enclosure 3 is configured so as to get elastically deformed when there is a variation of pressure inside it. When the valves 43 and 44 are opened, the tightly sealed enclosure 3 thus provides easy compensation for the relative variations in pressure that appear inside the adiabatic enclosure 4, for example because of the heating of the accumulators 2 or a variation in altitude or a de-gassing that might occur in the adiabatic enclosure during a possible destruction of an accumulator 2. Furthermore, in last-named instance, the de-gassing could be confined to the interior of the battery 1.

The battery 1 could be provided with a pressure sensor positioned inside the enclosure 4 in order to open the valves 43 and 44 in the event of excess pressure inside the enclosure 4.

As illustrated in FIG. 3, the exchanger 56 could include a lower deformable face 58. This lower face 58 advantageously has an undulating section, which facilitates a large-amplitude deformation during the variations in pressure. The lower face of the exchanger 56 is advantageously made out of a thermally conductive material such as a metal in order to promote exchanges with the exterior.

Figure 4:
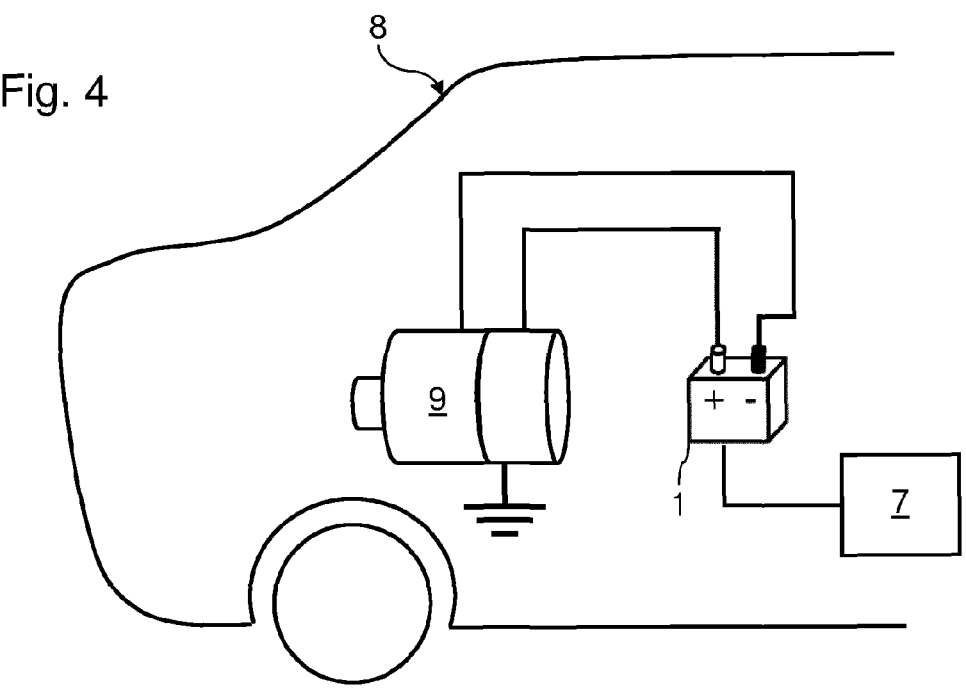
FIG. 4 is a schematic representation of the layout of a battery according to the invention in a motor vehicle.

FIG. 4 schematically represents the battery 1 according to the invention associated with different components in a motor vehicle 8. The vehicle 8 comprises an electric motor 9 powered by a battery 1. The electric motor 9 can either be the sole motor driving the vehicle 8 or be associated with another type of motor in a hybrid motor drive unit.

In order that the use of the battery 1 does not induce an excessive rise in temperature, the battery 1 is advantageously sized so that its thermal temperature constant (defined as the duration needed for the battery to pass from a temperature of 20° C. to its maximum temperature of use: this constant is proportional to the calorific capacity of the battery, its mass and the power dissipated by intensive use and is inversely proportional to the thermal resistance of the walls) is far greater than the autonomy of the vehicle 8 with the electric motor 9 when this electric motor 9 is powered solely by the discharging of the battery 1. This thermal time constant could for example be at least twice this autonomy so that there is no risk that a continuous use of the battery 1 might induce its deterioration by heating.

The invention claimed is:

1. A battery for powering an electrical motor drive of a motor vehicle, said battery comprising: electrochemical accumulators included in an adiabatic enclosure; a tightly-sealed enclosure, wherein said tightly-sealed enclosure is air-tight and water-tight, contains said adiabatic enclosure, has a volume that is external to said adiabatic enclosure, and benefits from thermal exchanges with an exterior of said tightly sealed enclosure; and a valve that selectively sets up a flow of a heat-transfer fluid between said adiabatic enclosure and said volume; wherein said tightly sealed enclosure is configured to be elastically deformed during a variation in pressure therein.

2. The battery of claim 1, wherein the tightly sealed enclosure comprises at least one deformable face comprising an undulating section.

3. The battery of claim 2, wherein said deformable face comprises a thermally conductive material.

4. The battery of claim 1, wherein said tightly-sealed enclosure selectively sets up a flow of gas with said adiabatic enclosure and wherein said tightly-sealed enclosure comprises an air/air exchanger with the exterior.

5. The battery of claim 1, further comprising a circuit for the circulation of air between said electrochemical accumulators, and a device for generating a flow of air in said circuit.

6. The battery of claim 1, wherein said adiabatic enclosure has thermal resistivity relative to the exterior that is greater than 0.1 m$^2$ K/W.

7. The battery of claim 1, wherein said adiabatic enclosure is filled with an inert gas.

8. A motor vehicle comprising an electrical motor, and a battery as recited in claim 1 configured to power said electric motor, said battery having a thermal time constant that is at least twice the battery life of the vehicle driven by the electrical motor.

9. The motor vehicle of claim 8, further comprising a probe for measuring an internal temperature inside said adiabatic enclosure; a probe for measuring an external temperature outside said battery, and a command module configured for setting up flow of heat-transfer fluid between said external volume and said adiabatic enclosure when a condition is true, said condition being selected from the group consisting of a first condition and a second condition, wherein said first condition comprises said external temperature being higher than said internal temperature, and said internal temperature being lower than a low threshold, and wherein said second condition comprises said external temperature being lower than said internal temperature and said internal temperature being higher than a high threshold.

10. The motor vehicle of claim 9, wherein said command module is configured for determining an absence of powering of said motor by said battery, and to establish flow of heat-transfer fluid based at least in part on said determination.

11. The motor vehicle of claim 9, wherein said battery comprises a circuit, housed in said adiabatic enclosure, for balancing charges of said electrochemical accumulators, said circuit comprising a discharging resistor, and wherein said command module is configured to activate discharge of said electrochemical accumulators into said discharging resistor when a temperature within said adiabatic enclosure is lower than a pre-defined low threshold and when an absence of powering of said motor has been determined.

* * * * *